United States Patent
Rofougaran

(10) Patent No.: US 8,433,256 B2
(45) Date of Patent: *Apr. 30, 2013

(54) COMMUNICATION DEVICES WITH INTEGRATED THERMAL SENSING CIRCUIT AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,411

(22) Filed: Apr. 2, 2012

(65) Prior Publication Data
US 2012/0189038 A1    Jul. 26, 2012

Related U.S. Application Data

(63) Continuation of application No. 11/804,522, filed on May 17, 2007, now Pat. No. 8,175,545.

(51) Int. Cl.
*H04B 1/40* (2006.01)
(52) U.S. Cl.
USPC ............... 455/77; 455/73; 455/87; 455/120; 455/125

(58) Field of Classification Search ............ 455/77, 455/73, 254, 252.1, 522, 127.1, 76, 87, 404.2, 455/414.1, 414.3, 456.1, 456.3, 39, 120, 455/125, 130, 160.1, 169.1, 173.1, 178.1, 455/191.1

See application file for complete search history.

(56) References Cited

U.S. PATENT DOCUMENTS

| | | | |
|---|---|---|---|
| 6,864,802 B2* | 3/2005 | Smith et al. | 340/870.07 |
| 8,175,545 B2* | 5/2012 | Rofougaran | 455/77 |
| 2007/0072638 A1* | 3/2007 | Yang et al. | 455/522 |
| 2010/0144308 A1* | 6/2010 | Jin et al. | 455/404.1 |

* cited by examiner

*Primary Examiner* — Tuan Pham
(74) *Attorney, Agent, or Firm* — Garlick & Markison; Bruce E. Stuckman

(57) ABSTRACT

A communication device includes an integrated circuit having an on-chip thermal sensing circuit that generates a temperature signal based on a temperature of the integrated circuit. A processing module processes the temperature signal to generate temperature information that can be transmitted to a remote device or processes the temperature signal to generate control for adjusting transmit and/or receive characteristics of an RF transceiver.

20 Claims, 11 Drawing Sheets

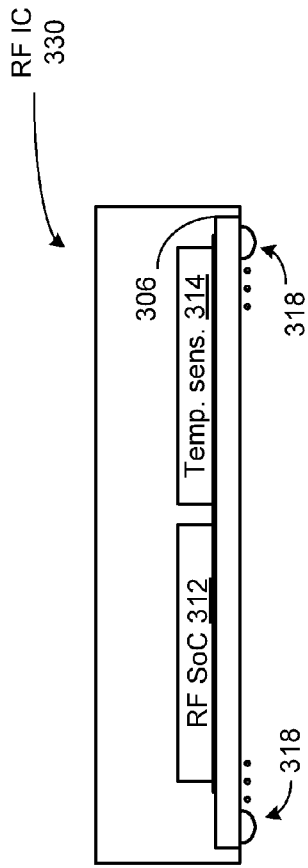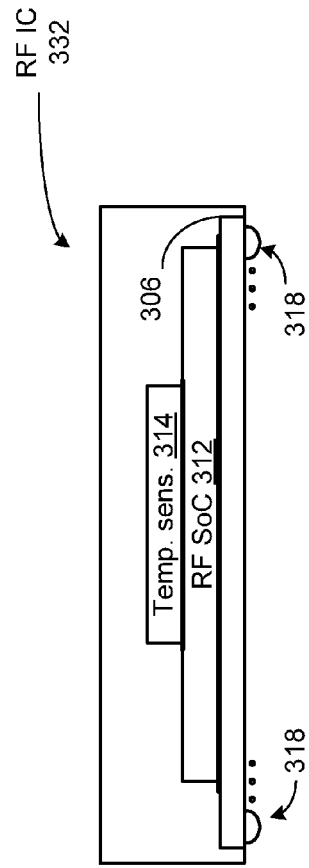

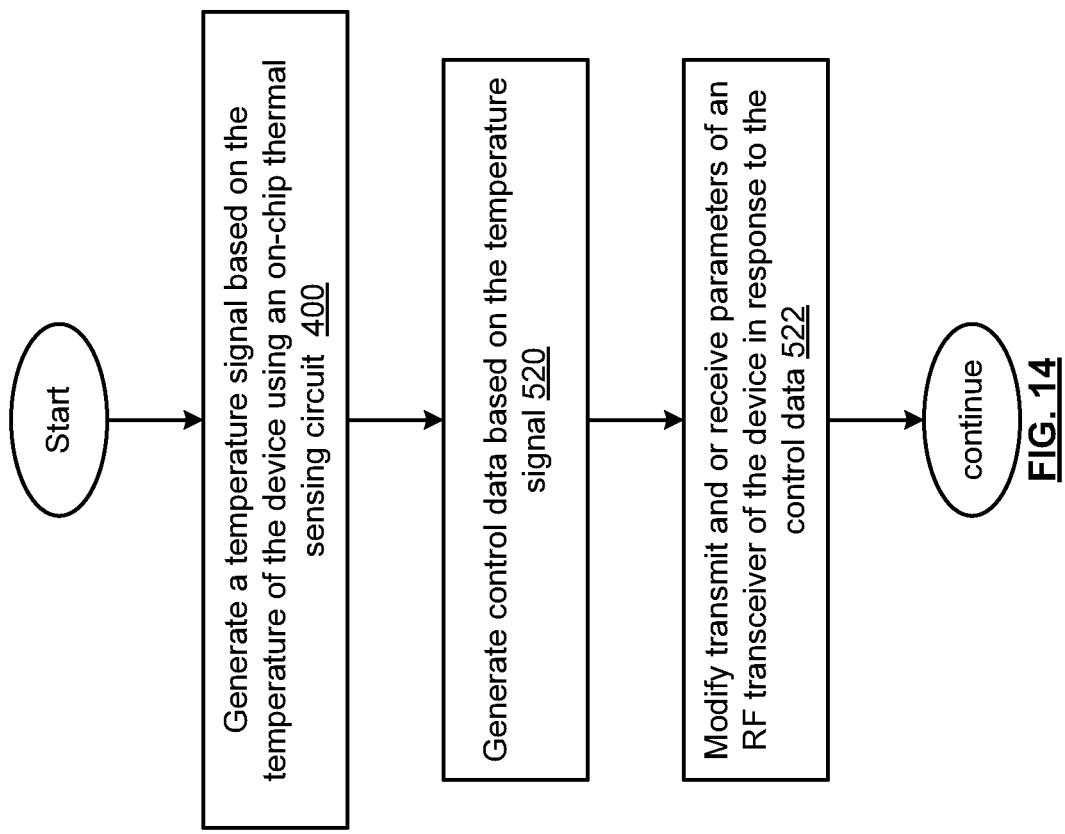

COMMUNICATION DEVICES WITH INTEGRATED THERMAL SENSING CIRCUIT AND METHODS FOR USE THEREWITH

CROSS-REFERENCE TO RELATED APPLICATIONS

The present U.S. Utility patent application claims priority pursuant to 35 U.S.C. §120, as a continuation, to U.S. Utility patent application Ser. No. 11/804,522, entitled COMMUNICATION DEVICES WITH INTEGRATED THERMAL SENSING CIRCUIT AND METHODS FOR USE THEREWITH, filed on May 17, 2007, which is hereby incorporated herein by reference in its entirety and made part of the present U.S. Utility patent application for all purposes.

The present application is related to the application having Ser. No. 11/804,642, entitled RF INTEGRATED CIRCUIT HAVING AN ON-CHIP THERMAL SENSING CIRCUIT, filed on May 17, 2007, now abandoned, the contents of which is incorporated herein by reference thereto.

BACKGROUND OF THE INVENTION

1. Technical Field of the Invention

This invention relates generally to mobile communication devices and more particularly to a combined voice, data and RF integrated circuit.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

The characteristics of various transmit and receive parameters can vary as a function of the temperature of the device.

The device temperature can vary based on both ambient temperature, and the operating conditions of the device.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 3:
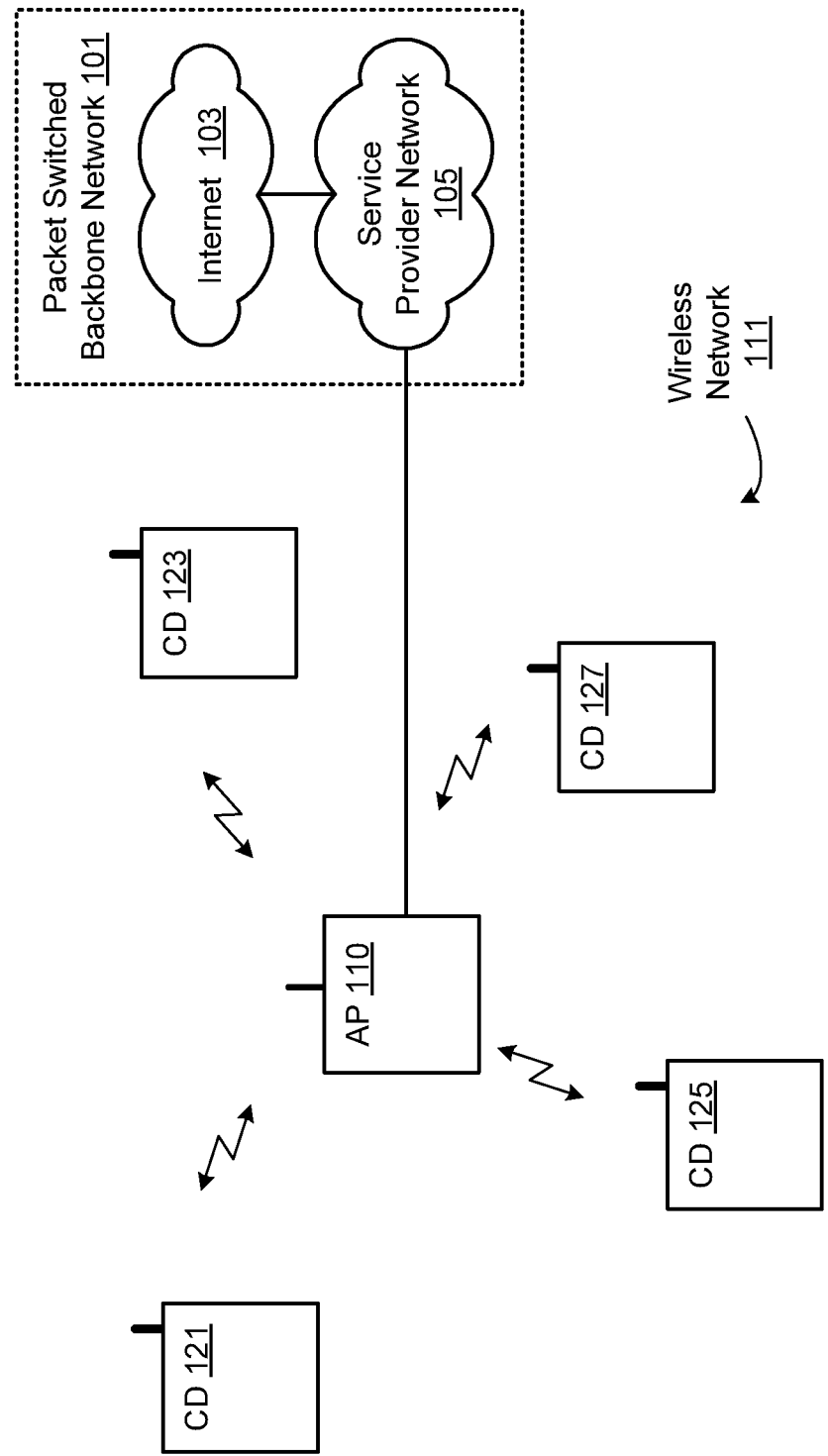

FIG. 3 presents a pictorial representation of a wireless network 111 in accordance with an embodiment of the present invention.

Figure 4:
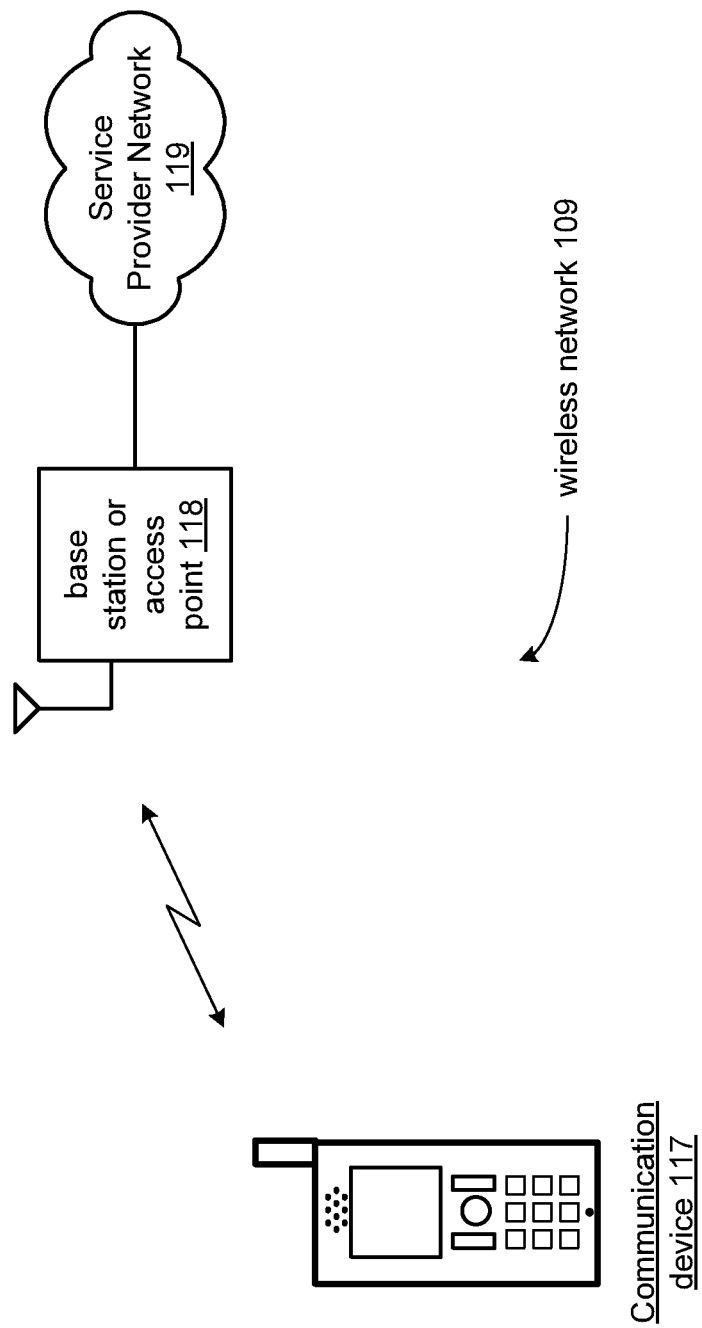

FIG. 4 presents a pictorial representation of a wireless network 109 in accordance with an embodiment of the present invention.

Figure 5:
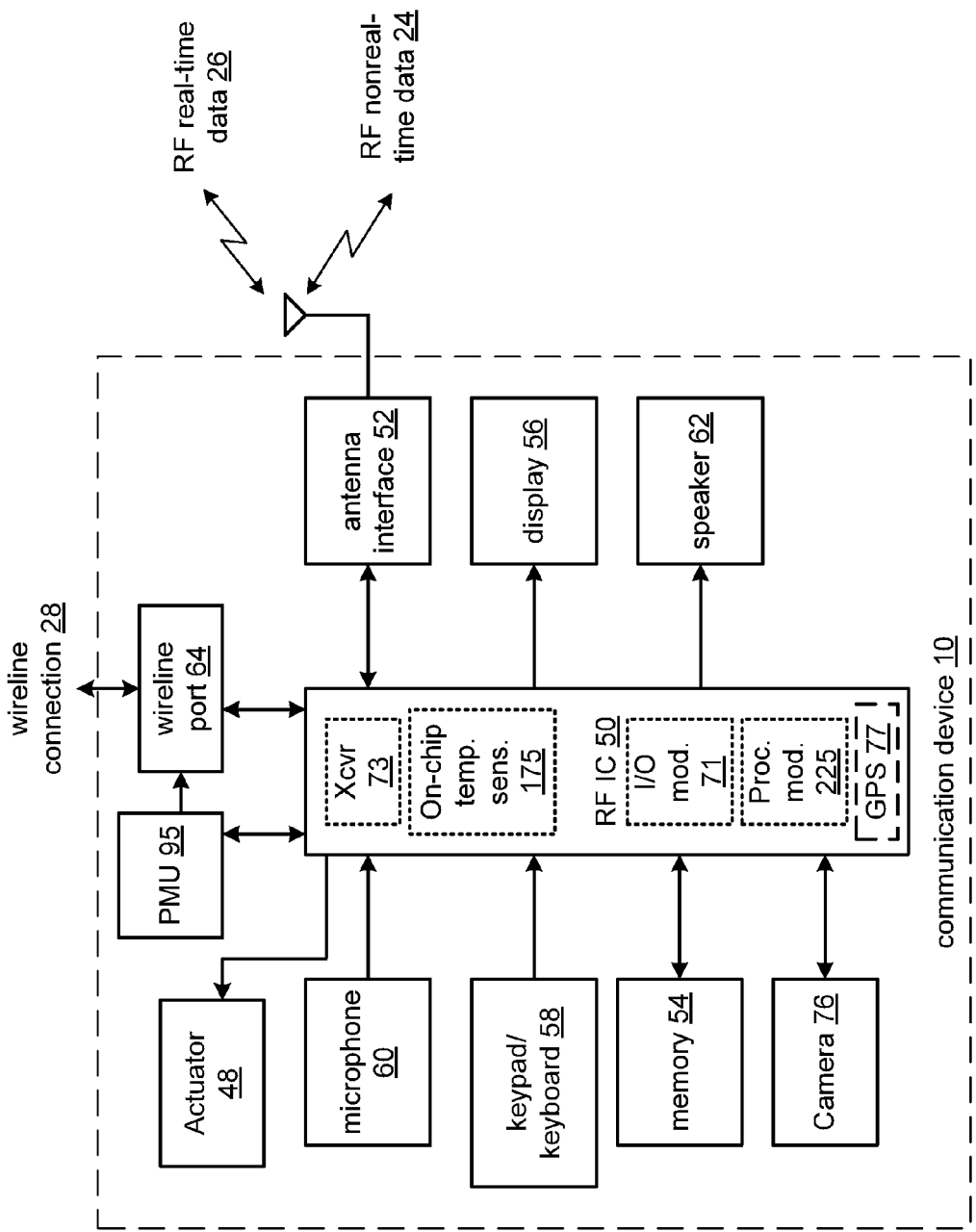
Figure 6:
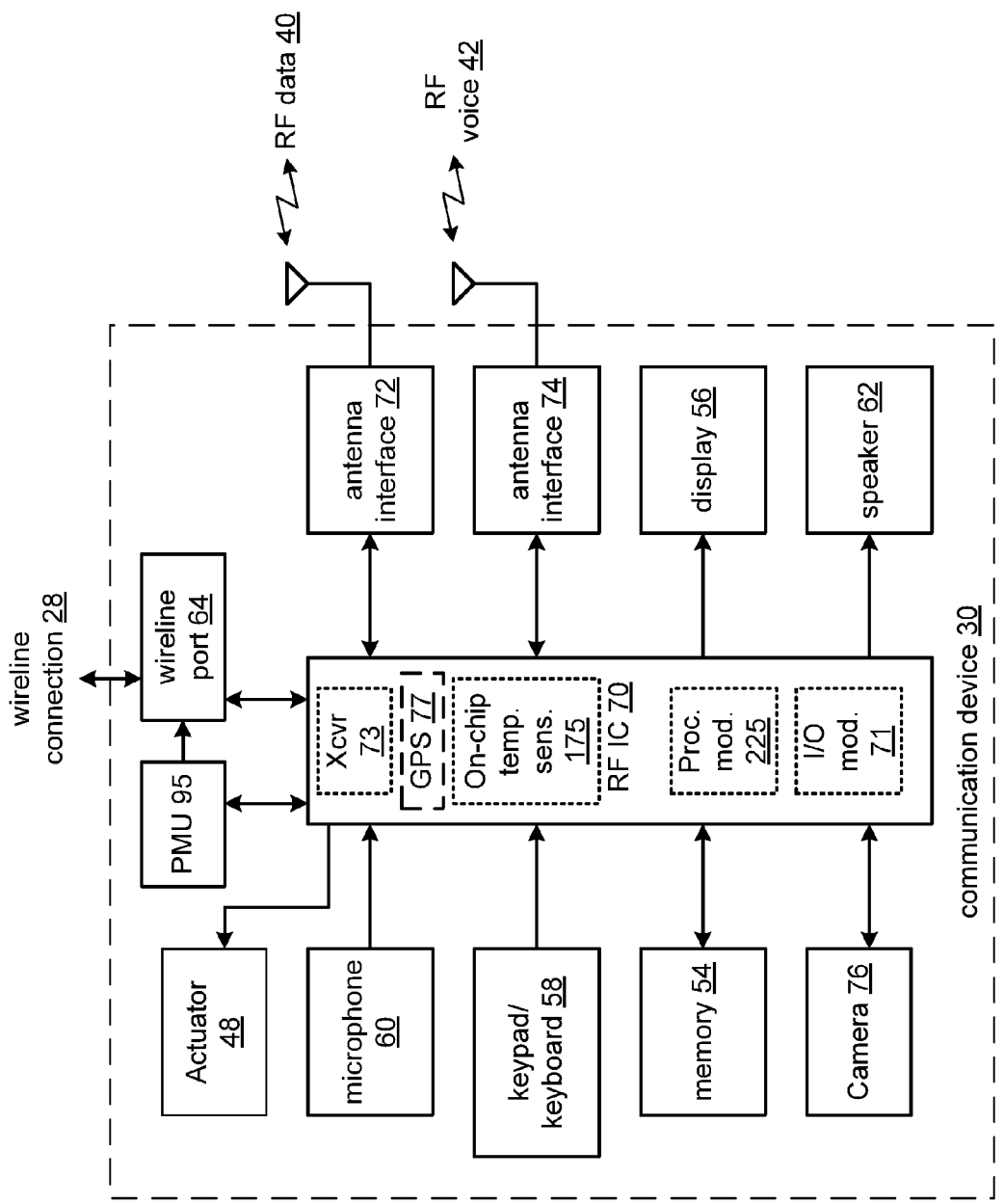
Figure 7:
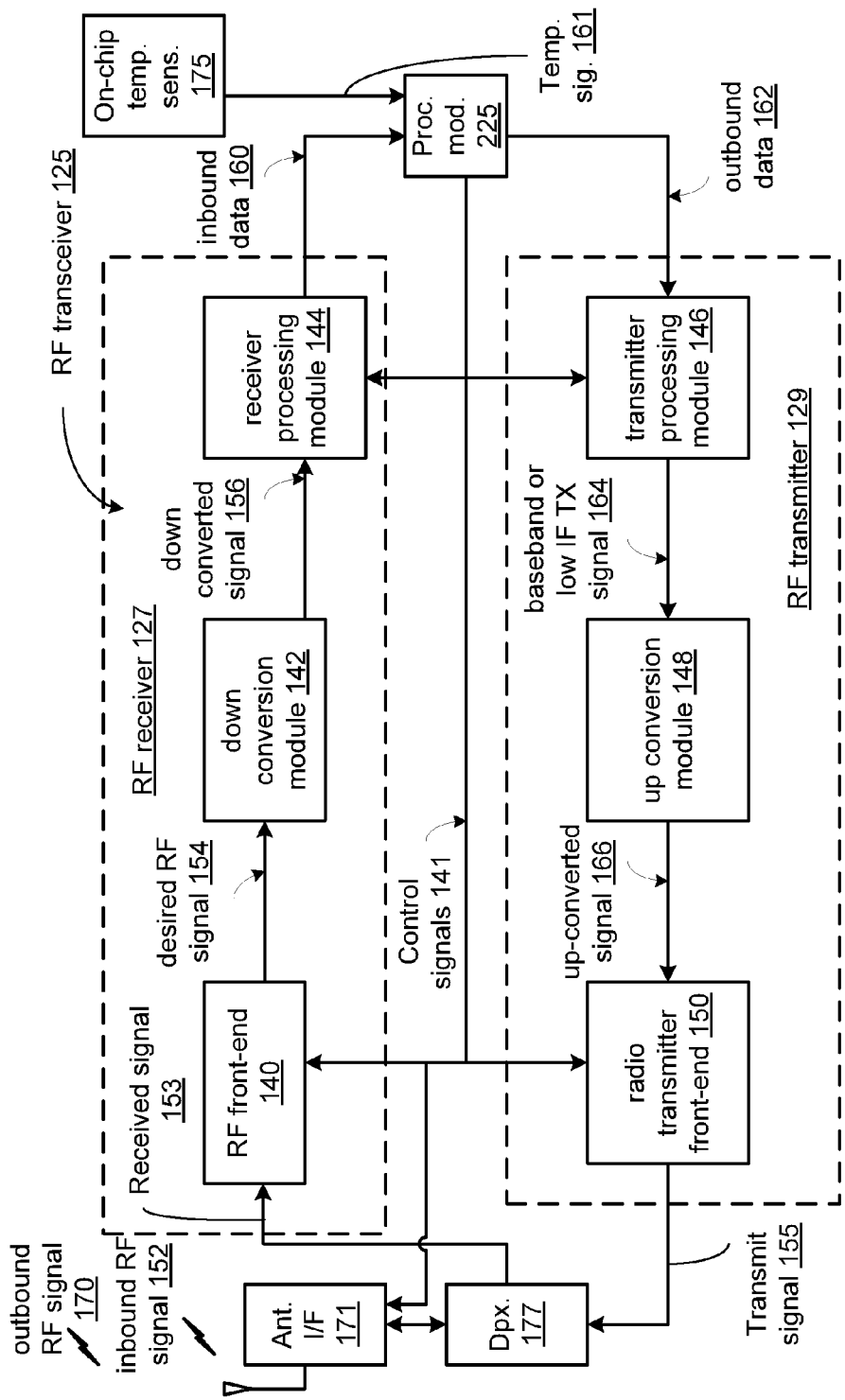

FIG. 5 is a schematic block diagram of an embodiment of an integrated circuit in accordance with the present invention;

FIG. 6 is a schematic block diagram of another embodiment of an integrated circuit in accordance with the present invention;

FIG. 7 is a schematic block diagram of an embodiment of RF transceiver 125 in accordance with the present invention;

FIG. 8 is a side view of a pictorial representation of an integrated circuit package in accordance with an embodiment of the present invention.

FIG. 9 is a side view of a pictorial representation of an integrated circuit package in accordance with an embodiment of the present invention.

FIG. 10 is a side view of a pictorial representation of an integrated circuit package in accordance with an embodiment of the present invention.

Figure 11:
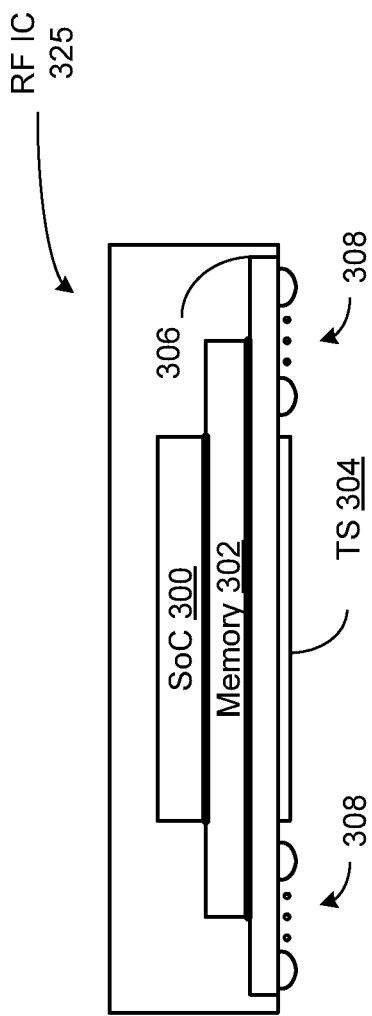

FIG. 11 is a side view of a pictorial representation of an integrated circuit package in accordance with an embodiment of the present invention.

Figure 12:
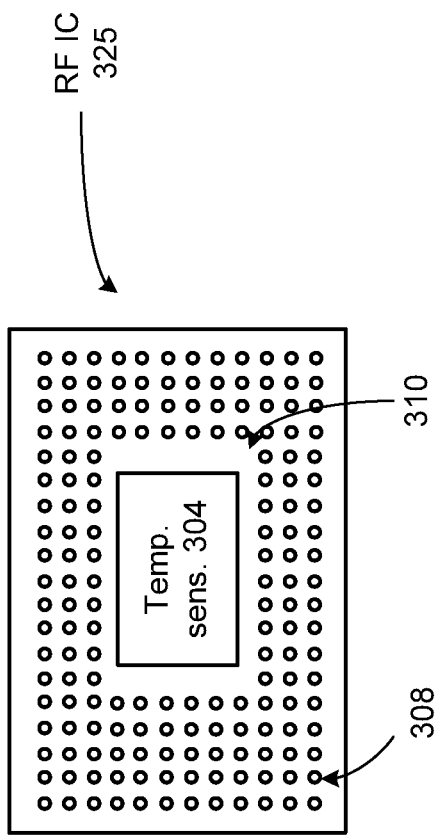

FIG. 12 is a bottom view of a pictorial representation of an integrated circuit package in accordance with an embodiment of the present invention.

Figure 13:
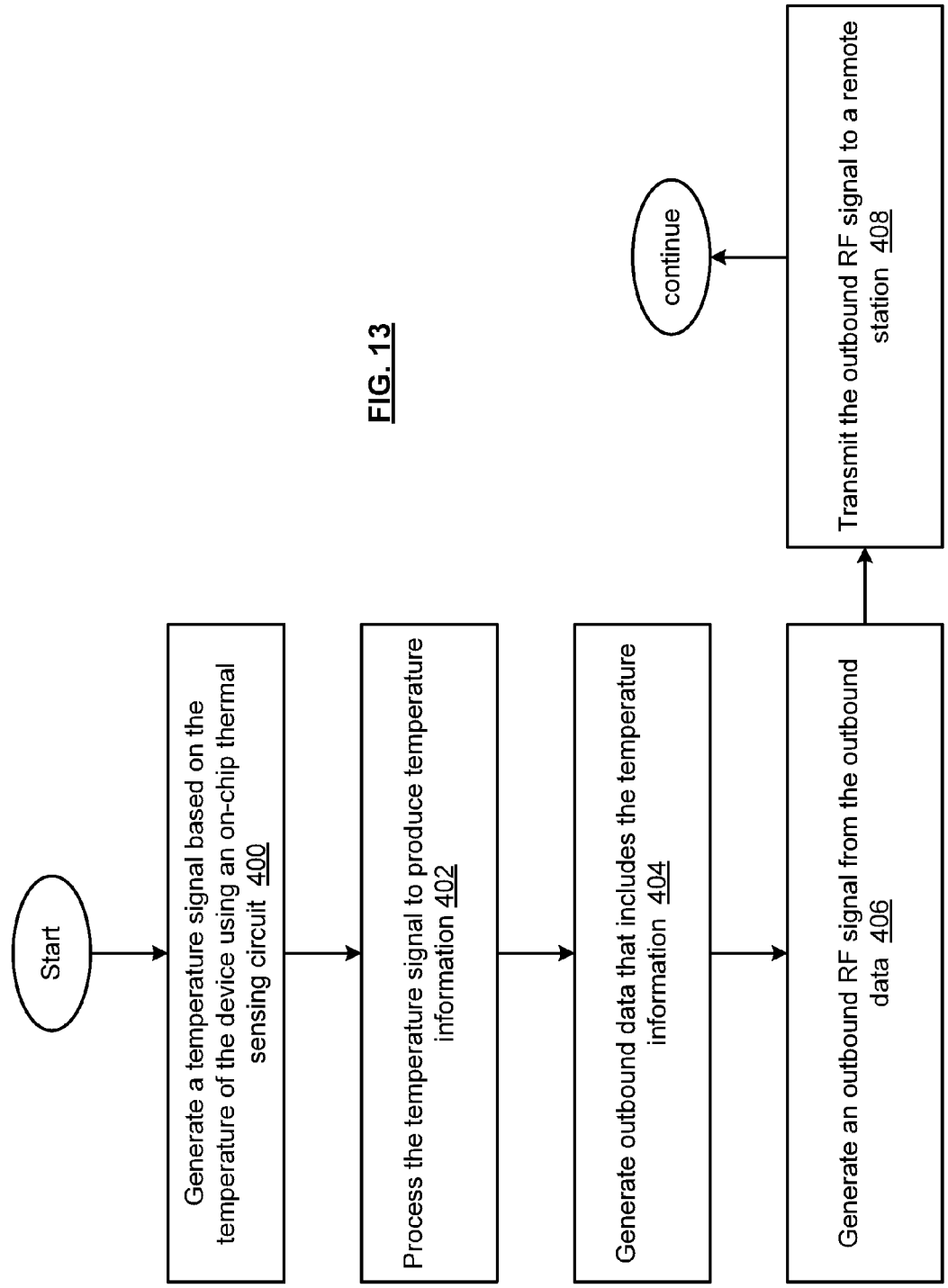

FIG. 13 is a flow chart of an embodiment of a method in accordance with the present invention.

FIG. 14 is a flow chart of an embodiment of a method in accordance with the present invention.

DETAILED DESCRIPTION OF THE INVENTION

Figure 1:
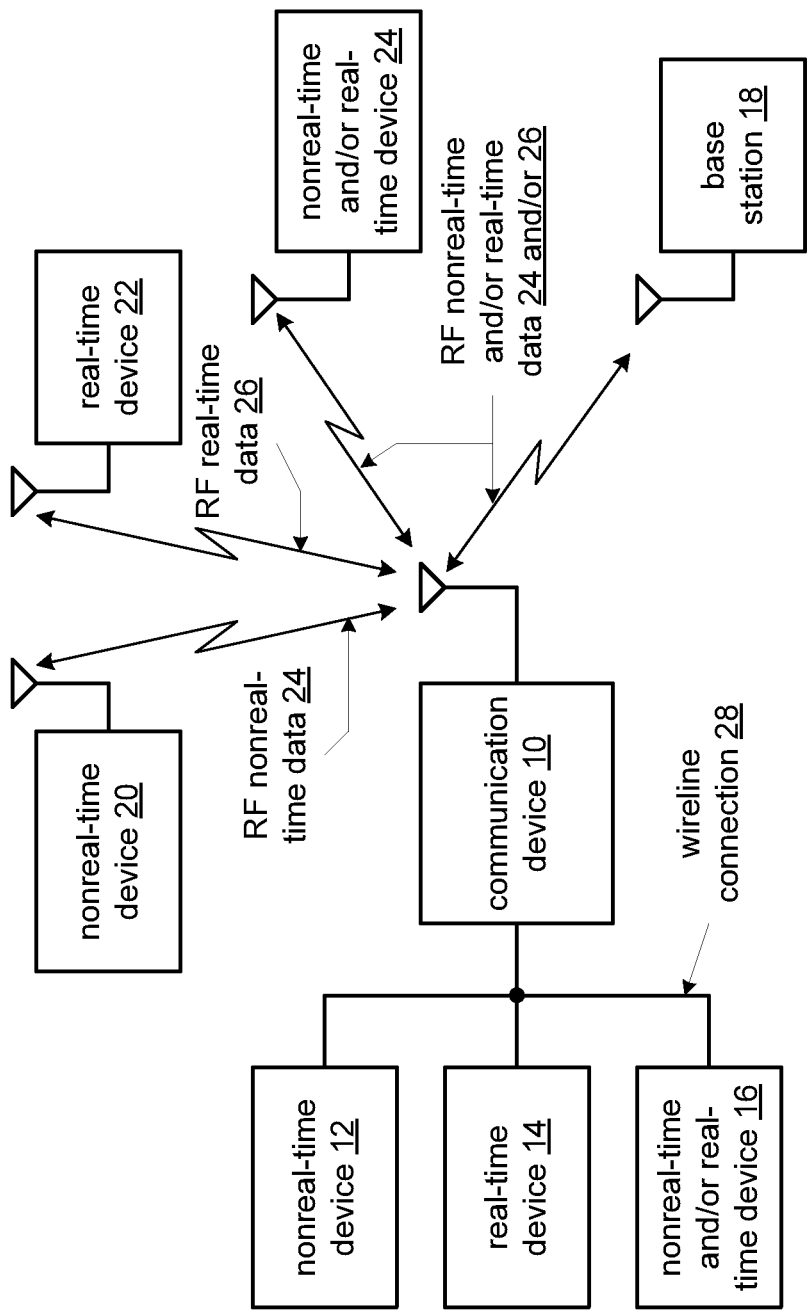
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, non-real-time device 20, real-time device 22, and non-real-time and/or real-time device 24. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, game device, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as an RF integrated circuit that includes one or more features or functions of the present invention. Such integrated circuits shall be described in greater detail in association with FIGS. 3-14 that follow.

Figure 2:
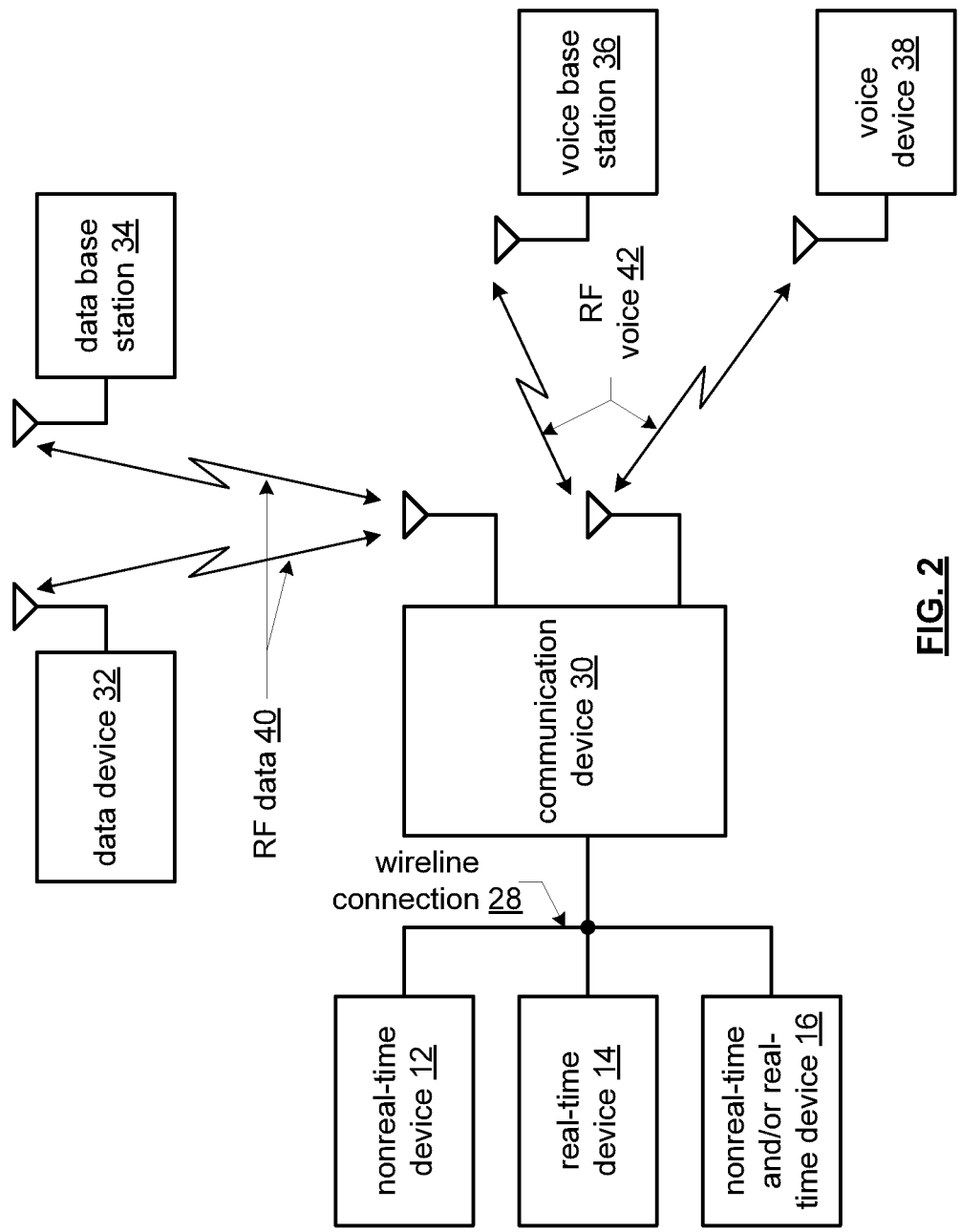
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

FIG. 3 presents a pictorial representation of a wireless network 111 in accordance with an embodiment of the present invention. The wireless network 111 includes an access point 110 that is coupled to packet switched backbone network 101. The access point 110 manages communication flow over the wireless network 111 destined for and originating from each of communication devices 121, 123, 125 and 127. Via the access point 110, each of the communication devices 121, 123, 125 and 127 can access service provider network 105 and Internet 103 to, for example, surf web-sites, download audio and/or video programming, send and receive messages such as text messages, voice message and multimedia messages, access broadcast, stored or streaming audio, video or other multimedia content, play games, send and receive telephone calls, and perform any other activities, provided directly by access point 110 or indirectly through packet switched backbone network 101.

One or more of the communication devices 121, 123, 125 and 127, such as communication device 125 is a mobile device that can include the functionality of communication devices 10 or 30. In particular, communication device 125 includes an RF integrated circuit (IC) having an on-chip thermal sensing circuit that generates a temperature signal based on the temperature of the device. The RF IC processes the temperature signal to produce temperature information and can generate outbound data that includes the temperature information, generates an outbound RF signal from outbound data and transmits the outbound RF signal to a remote station, such as the access point 110. For instance, temperature information can be shared with an external device such as access point 110, communication devices 121, 123 or 127 or another device coupled to either service provider network 105 or Internet 103 to support an application that uses temperature information. For example, communication device 125 can be placed out of doors and be used to generate temperature information that represents the outdoor temperature at the location that the communication device 125. In an embodiment, communication device 125 further includes a GPS receiver that generates position information, such as the GPS coordinates for the communication device. The temperature information and position information can be sent together with other user reported weather information such as snowing, sleeting, fog, rain, thunderstorms, etc. to the remote weather application for the purposes of more accurate weather reporting or forecasting. In an embodiment of the present invention, additional processing may be performed on the temperature signal to produce temperature information that represents the ambient temperature. In addition to converting the temperature signal into temperature data, based on the characteristics of the particular temperature sensor that is used, this processing can further adjust the temperature data to compensate for heat generated by the communication device and in particular the RF IC that incorporates the thermal sensing circuit in determining the ambient temperature, if desired.

In an embodiment of the present invention, communication device 125 can change its own transmit and receive characteristics, based on the temperature information or control signals generated based on the temperature signal. Examples of transmit and receive characteristics include: transmit power levels, antenna configurations such as multi-input multi-output (MIMO) configuration, beam patterns, polarization patterns, diversity configurations, protocol parameters, receiver gain and/or sensitivity and other transmit and receive characteristics of the access point. For instance, an increase in temperature of the RF IC can modify the noise characteristics of an RF receiver, and the receiver sensitivity, gain, bandwidth or other receiver parameters can be adjusted to compensate for this increase in noise. Further, an increase in thermal noise may require an increase in transmit power and an increase in antenna gain. Alternatively, in implementations where an increase in device temperature can impede the performance of the RF IC or communication device, transmit power, processor speed, and/or power consumption of the device may be lowered to reduce the temperature of the device. It should be noted that these examples provide but a few examples of the many possible ways that temperature information or control signals can be used to adjust transmit and/or receive parameters of the communication device 125 in accordance with the present invention.

In a further embodiment of the present invention, temperature information can be transmitted to access point 110 and used to generate control signals to modify the transmit and receive characteristics of access point 110, in a complementary fashion. For example, an increase in temperature of communication device 125 may be compensated by increasing the sensitivity of the access point's receiver, increasing the power level of transmissions directed to communication device 125, control antenna characteristics to increase the gain of transmissions to and from communication device 125, etc.

FIG. 4 presents a pictorial representation of a wireless network 109 in accordance with an embodiment of the present invention. In particular, communication device 117 is a wireless telephone device or other device that operates that includes a wireless telephone transceiver and that is capable of placing a receiving conventional wireless telephone calls voice over internet protocol telephone calls, communicating via a cellular voice or data protocol such as GSM, GPRS, AMPS, UMTS, EDGE or other wireless telephony protocol that can be used to communicate with a service provider network 119, such as a wireless telephone or data network, via base station or access point 118. In a similar fashion to communication device 125, communication device 117 includes a thermal sensing circuit and an RF IC that generates temperature information and/or control signals that can be used by communication device 117 and/or service provider network 119 for temperature-based services, either by itself or in conjunction with position information, user-provided information, etc. In addition, the temperature information and/or control signals can be used by communication device 117 for adjusting transmit, receive and antenna characteristics either of itself or base station/access point 118, in a similar fashion to communication device 125 discussed in conjunction with FIG. 3.

FIG. 5 is a schematic block diagram of an embodiment of an integrated circuit in accordance with the present invention. In particular, an RF integrated circuit (IC) 50 is shown that implements communication device 10 in conjunction with microphone 60, keypad/keyboard 58, memory 54, speaker 62, display 56, camera 76, antenna interface 52 and wireline port 64. In operation, RF IC 50 includes a transceiver 73 that operates in accordance with a wireless local area network protocol, a wireless personal area network protocol, a wireless telephony protocol, or a wireless chip-to-chip protocol. Transceiver 73 includes RF and baseband modules for formatting and modulating data into RF real-time data 26 and non-real-time data 24 and transmitting this data via an antenna interface 52 and antenna such as fixed antenna a single-input single-output (SISO) antenna, a multi-input multi-output (MIMO) antenna, a diversity antenna system, an antenna array or other antenna configuration that allows the beam shape, gain, polarization or other antenna parameters to be controlled. In addition, RF IC 50 includes input/output module 71 that includes the appropriate interfaces, drivers, encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices. Optional GPS receiver 77 is included for generating position information that can be used in conjunction with temperature information in support of weather application and other location-based services.

Power management circuit (PMU) 95 includes one or more DC-DC converters, voltage regulators, current regulators or other power supplies for supplying the RF IC 50 and optionally the other components of communication device 10 and/or its peripheral devices with supply voltages and or currents (collectively power supply signals) that may be required to power these devices. Power management circuit 95 can operate from one or more batteries, line power, an inductive power received from a remote device, a piezoelectric source that generates power in response to motion of the integrated circuit and/or from other power sources, not shown. In particular, power management module can selectively supply power supply signals of different voltages, currents or current limits or with adjustable voltages, currents or current limits in response to power mode signals received from the RF IC 50. While shown as an off-chip module, PMU 95 can alternatively implemented as an on-chip circuit.

In addition, RF IC 50 includes an on-chip thermal sensing circuit such as on-chip temperature sensor 175 that generates a temperature signal based on motion of the RF IC 50. In an embodiment of the present invention, the on-chip temperature sensor is a resistive thermal detector, thermocouple, a silicon bandgap thermal sensor, a cantilever beam capacitive thermal sensor or other thermal sensor, with either on-chip or off-chip components. In an embodiment the temperature sensor is implemented with microelectromechanical systems (MEMS) technology and is formed via dry etching, wet etching, electro discharge machining and/or via other MEMS or non-MEMS technology.

In operation, a on-chip thermal sensing circuit 175 generates a temperature signal based on a temperature of the RF integrated circuit 50. This temperature signal may be a analog, digital or discrete time, voltage or current signal that represents a temperature of the RF IC 50, the communication device 10 and/or the ambient environment of communication device 10.

In an embodiment of the present invention, processing module 225 operates to generate a control signal in accordance with the temperature signal that can be used to adjust a transmit or receiver parameter of the RF IC 50, such that inbound and outbound RF signals are processed by transceiver 73 based on the control signal. For instance, the control signal can indicate a transmit power level, a protocol parameter selection, a receiver sensitivity, an in-air beamforming phase, a diversity antenna selection, a polarization antenna selection, a diversity antenna configuration, a polarized antenna configuration, as a multi-input multi-output (MIMO) antenna configuration, and/or a single-input single-output (SISO) antenna configuration.

In an embodiment of the present invention, processing module 225 processes the temperature signal to produce temperature information for inclusion in outbound data for transmission by transceiver 73. Temperature information can include temperature data that represents an actual temperature of the RF IC 50, communication device 10 and/or ambient environment of communication device 10, as a digital value, range of values or other indication.

As discussed in conjunction with FIG. 3, the temperature information can be formatted for use by an external device and transmitted along with position information and/or user generated data in accordance with a weather application. Further temperature information is formatted for use by an external device in accordance with other application such as location-based applications that utilize temperature information to determine location or to provide location based services, etc.

In particular, processing module 225 uses a circuit, a look-up table, algorithm or other means to convert the temperature signal into temperature information and/or control signals. Processing module 225, may be implemented with a dedicated or shared microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions of an associated memory. The associated memory may be a single memory device or a plurality of memory devices that are either on-chip or off-chip such as memory. Such a memory device may be a read-only memory, random access memory, volatile memory, non-volatile memory, static memory, dynamic memory, flash memory, and/or any device that stores digital information. Note that when the RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the RF IC 50 further executes operational instructions that implement one or more of the applications (real-time or non-real-time) attributed to communication devices 10, 30 and/or 125 as discussed above and in conjunction with FIGS. 1-3.

FIG. 6 is a schematic block diagram of another embodiment of an integrated circuit in accordance with the present invention. In particular, FIG. 6 presents a communication device 30 that includes many common elements of FIG. 5 that are referred to by common reference numerals. RF IC 70 is similar to RF IC 50 and is capable of any of the applications, functions and features attributed to RF IC 50 as discussed in conjunction with FIGS. 3 and 4. However, RF IC 70 includes two separate wireless transceivers for communicating, contemporaneously, via two or more wireless communication protocols via RF data 40 and RF voice signals 42.

In operation, the RF IC 70 executes operational instructions that implement one or more of the applications (real-time or non-real-time) attributed to communication devices 10, 30 and 125 as discussed above and in conjunction with FIG. 1-4.

FIG. 7 is a schematic block diagram of an embodiment of RF transceiver 125, such as transceiver 73, in accordance with the present invention. The RF transceiver 125 includes an RF transmitter 129, and an RF receiver 127. The RF receiver 127 includes a RF front end 140, a down conversion module 142 and a receiver processing module 144. The RF transmitter 129 includes a transmitter processing module 146, an up conversion module 148, and a radio transmitter front-end 150.

As shown, the receiver and transmitter are each coupled to an antenna through an off-chip antenna interface 171 and a diplexer (duplexer) 177, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration. Also, the antenna structure of the wireless transceiver may depend on the particular standard(s) to which the wireless transceiver is compliant and the applications thereof.

In operation, the transmitter receives outbound realtime data 162 and outbound non-realtime data 163 from a host device, such as communication devices 10, 30, 117 or 125 or other source via the transmitter processing module 146. The transmitter processing module 146 processes the outbound realtime data 162 and outbound non-realtime data 163 in accordance with a particular wireless communication standard (e.g., IEEE 802.11, Bluetooth, RFID, GSM, CDMA, et cetera) to produce baseband or low intermediate frequency (IF) transmit (TX) signals 164 that contain outbound realtime data 162 and/or outbound non-realtime data 163. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation 168.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152 and optionally controls the configuration of the antenna in response to one or more control signals 141 generated by processing module 225.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound realtime data 160 and inbound non-realtime data 161. The processing performed by the receiver processing module 144 can includes, but is not limited to, digital intermediate frequency to baseband conversion, demodulation, demapping, depuncturing, decoding, and/or descrambling.

Further, processing module 225 generates one or more control signals 141 based either temperature information generated from an on-chip thermal sensing circuit such as on-chip temperature sensor 175 (as shown) or from an off-chip temperature sensor or other temperature sensor, or based on control data received in inbound data 160 from a remote station such as access point 110. In operation, processing module 225 generates control signals 141 to modify the transmit and/or receiver parameters of the RF transceiver 125 such as protocol parameters used by receiver processing module 144 and transmitter processing module 146, antenna configurations used by antenna interface 171 to set the beam pattern, gain, polarization or other antenna configuration of the antenna, transmit power levels used by radio transmitter front-end 150 and receiver parameters used by RF front-end 140.

In addition, as previously described, processing module 225 generates temperature information from one or more temperature signals 161 and optionally includes this temperature information in outbound data 162 that is transmitted to a remote station such as access point 110 or other external device.

FIG. 8 is a side view of a pictorial representation of an integrated circuit package in accordance with an embodiment of the present invention. RF IC 330, such as RF IC 50 or 70, includes a temperature sensor die 314 with a thermal sensing circuit such as on-chip temperature sensor 175 temperature sensor and an RF system on a chip (SoC) die 312 that includes the remaining elements of RF IC 50 or 70, a substrate 306, and bonding pads 318. This figure is not drawn to scale, rather it is meant to be a pictorial representation that illustrates the juxtaposition of the RF SoC die 312, temperature sensor die 314 and the substrate 306. RF SoC die 312 and temperature sensor die are coupled to one another and to respective ones of the bonding pads 318 using bonding wires, bonding pads and/or by other connections.

FIG. 9 is a side view of a pictorial representation of an integrated circuit package in accordance with an embodiment of the present invention. RF IC 332 is similar to the configuration described in conjunction with FIG. 8 is presented with similar elements referred to by common reference numerals. In particular, alternate stacked configuration is shown that stacks temperature sensor die 314 on top of RF SoC die 312. In this configuration, RF SoC die 312 and temperature sensor die can be coupled to one another using bonding wires, bonding pads, conductive vias and/or by other connections. This figure is also not drawn to scale.

FIG. 10 is a side view of a pictorial representation of an integrated circuit package in accordance with an embodiment of the present invention. RF IC 334 is similar to the configuration described in conjunction with FIGS. 8 and 9 is presented with similar elements referred to by common reference numerals. In this particular configuration, on-chip temperature sensor 175 is included on RF SoC die 316 that includes the remaining components or RF IC 50 or 70. This figure is not drawn to scale FIG. 11 is a side view of a pictorial representation of an integrated circuit package in accordance with the present invention. RF IC 325, such as RF IC 50 or 70, includes a system on a chip (SoC) die 300, a memory die 302 a substrate 306, bonding pads 308 and temperature sensor 304, such as on-chip thermal sensing circuit 175. This figure is not drawn to scale. In particular, the RF IC 325 is integrated in a package with a top and a bottom having a plurality of bonding pads 308 to connect the voice data and RF IC 325 to a circuit board, and wherein the on-chip temperature sensor 304 is integrated along the bottom of the package. In an embodiment of the present invention, die 302 includes an on-chip memory and die 300 includes the processing module 225 and the remaining elements of RF IC 50 or 70. These dies are stacked and die bonding is employed to connect these two circuits and minimize the number of bonding pads, (balls) out to the package. Both SoC die 300 and memory die 302 are coupled to respective ones of the bonding pads 308 via bonding wires or other connections.

Temperature sensor 304 is coupled to the SoC die 300, and/or the memory die 302 via conductive vias, bonding wires, bonding pads or by other connections. The positioning of the temperature sensor on the bottom of the package in a flip chip configuration allows good heat absorption by the temperature sensor 304 to a circuit board when the RF integrated circuit is installed.

FIG. 12 is a bottom view of a pictorial representation of an integrated circuit package in accordance with the present invention. As shown, the bonding pads (balls) 308 are arrayed in an area of the bottom of the integrated circuit with an open center portion 310 and wherein the on-chip temperature sensor 304 is integrated in the open center portion. While a particular pattern and number of bonding pads 308 are shown, a greater or lesser number of bonding pads can likewise be employed with alternative configurations within the broad scope of the present invention.

While RF ICs 325, 330, 332 and 334 provide several possible implementations of RF ICs in accordance with the present invention, other circuits including other integrated circuit packages can be implemented including other stacked, in-line and flip chip configurations.

FIG. 13 is a flow chart of an embodiment of a method in accordance with the present invention. In particular a method is presented for use in conjunction with the one or more features or functions described in conjunction with FIGS. 1-12. In step 400, a temperature signal is generated based on the temperature of a device using an on-chip thermal sensing circuit. In step 402, the temperature signal is processed to produce temperature information. In step 404, outbound data is generated that includes the temperature information. In step 406, an outbound RF signal is generated from the outbound data. In step 408, the outbound RF signal is transmitted to a remote station.

FIG. 14 is a flow chart of an embodiment of a method in accordance with the present invention. In particular a method is presented for use in conjunction with the one or more features or functions described in conjunction with FIGS. 1-13. This method includes step 400 described in conjunction with FIG. 13. In addition, step 520, control signals are generated based on the temperature signal. Further, step 522 is included for modifying transmit and/or receive parameters of an RF transmitter of the device in response to control data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A wireless communication device comprising:
a on-chip thermal sensing circuit that generates a temperature signal based on a temperature of the wireless communication device; and
a processing module coupled to convert outbound data into an outbound symbol stream, to convert an inbound symbol stream into inbound data, and to generate a control signal based on the temperature indicated by the temperature signal;
an RF transceiver section, coupled to generate an outbound RF signal from the outbound symbol stream and to generate the inbound symbol stream from an inbound RF signal, wherein the RF transceiver section tunes an RF transceiver parameter based on the control signal to adjust the RF transceiver, wherein the RF transceiver parameter includes a receiver sensitivity; and
an antenna structure coupled to receive the inbound RF signal and to transmit the outbound RF signal.

2. The wireless communication device of claim 1 wherein the RF transceiver parameter further includes at least one of, a transmit power level and a protocol parameter selection.

3. The wireless communication device of claim 1 wherein the RF transceiver section operates in accordance with at least one of: an IEEE 802.11 protocol, a Bluetooth protocol, an Ultra-Wideband (UWB) protocol, a WIMAX protocol, a Global System for Mobile Communications protocol, a General Packet Radio Service protocol, and an Enhanced Data Rates for Global Evolution protocol.

4. The wireless communication device of claim 1 wherein the RF transceiver parameter further includes at least one of one of, an in-air beamforming phase, a diversity antenna selection, and a polarization antenna selection.

5. The wireless communication device of claim 1 wherein the antenna structure includes one of, a diversity antenna structure, a polarized antenna structure, as a multi-input multi-output (MIMO) antenna structure, as a single-input single-output (SISO) antenna structure and wherein the antenna structure modifies an antenna configuration based on the control signal.

6. The wireless communication device of claim 1 wherein the on-chip thermal sensing circuit includes one of:
a resistive thermal detector;
a thermocouple;
a silicon bandgap thermal sensor; and
a cantilever beam capacitive thermal sensor.

7. An integrated circuit (IC) comprising:
a on-chip thermal sensing circuit that generates a temperature signal based on a temperature of the integrated circuit; and
a processing module coupled to process a temperature signal, to convert outbound data into the outbound symbol stream, to convert the inbound symbol stream into inbound data, and to generate a control signal based on the temperature indicated by the temperature signal; and
an RF transceiver section, coupled to generate an outbound RF signal from the outbound symbol stream and to generate the inbound symbol stream from an inbound RF signal, wherein the RF transceiver section tunes an RF transceiver parameter based on the control signal to adjust the RF transceiver, wherein the RF transceiver parameter includes a receiver sensitivity.

8. The IC of claim 7 wherein the wherein the RF transceiver parameter further includes at least one of, a transmit power level and a protocol parameter selection.

9. The IC of claim 7 wherein the RF transceiver section operates in accordance with at least one of: an IEEE 802.11 protocol, a Bluetooth protocol, an Ultra-Wideband (UWB) protocol, a WIMAX protocol, a Global System for Mobile Communications protocol, a General Packet Radio Service protocol, and an Enhanced Data Rates for Global Evolution protocol.

10. The IC of claim 7 wherein the RF transceiver parameter further includes at least one of one of, an in-air beamforming phase, a diversity antenna selection, and a polarization antenna selection.

11. The IC of claim 7 wherein the RF transceiver parameter further includes an antenna configuration of an antenna structure, and wherein the antenna configuration includes one of, a diversity antenna configuration, a polarized antenna configuration, as a multi-input multi-output (MIMO) antenna configuration, and a single-input single-output (SISO) antenna configuration.

12. The IC of claim 7 wherein the on-chip thermal sensing circuit includes one of:
a resistive thermal detector;
a thermocouple;
a silicon bandgap thermal sensor; and
a cantilever beam capacitive thermal sensor.

13. An integrated circuit (IC) comprising:
a on-chip thermal sensing circuit that generates a temperature signal based on a temperature of the integrated circuit; and
a processing module coupled to process a temperature signal, to convert outbound data into the outbound symbol stream, to convert the inbound symbol stream into inbound data, and to generate a control signal based on the temperature indicated by the temperature signal; and
an RF transceiver section, coupled to generate an outbound RF signal from the outbound symbol stream and to generate the inbound symbol stream from an inbound RF signal, wherein the RF transceiver section tunes an RF transceiver parameter based on the control signal to adjust the RF transceiver, wherein the RF transceiver parameter includes a receiver sensitivity;
wherein the RF transceiver section operates in accordance with at least one of: an IEEE 802.11 protocol, a Bluetooth protocol, an Ultra-Wideband (UWB) protocol, a WIMAX protocol, a Global System for Mobile Communications protocol, a General Packet Radio Service protocol, and an Enhanced Data Rates for Global Evolution protocol.

14. The IC of claim 13 wherein the control signal further indicates at least one of, a transmit power level and a protocol parameter selection.

15. The IC of claim 13 wherein the control signal further indicates at least one of one of, an in-air beamforming phase, a diversity antenna selection, and a polarization antenna selection.

16. The IC of claim 13 wherein the control signal further indicates an antenna configuration of an antenna structure, and wherein the antenna configuration includes one of, a diversity antenna configuration, a polarized antenna configuration, as a multi-input multi-output (MIMO) antenna configuration, and a single-input single-output (SISO) antenna configuration.

17. The IC of claim 13 wherein the on-chip thermal sensing circuit includes one of:
   a resistive thermal detector;
   a thermocouple;
   a silicon bandgap thermal sensor; and
   a cantilever beam capacitive thermal sensor.

18. The wireless communication device of claim 1 wherein the RF transceiver section tunes the RF transceiver parameter based on the control signal to regulate the receiver sensitivity based on the temperature indicated by the temperature signal.

19. The IC of claim 7 wherein the RF transceiver section tunes the RF transceiver parameter based on the control signal to regulate the receiver sensitivity based on the temperature indicated by the temperature signal.

20. The IC of claim 13 wherein the RF transceiver section tunes the RF transceiver parameter based on the control signal to regulate the receiver sensitivity based on the temperature indicated by the temperature signal.

\* \* \* \* \*

UNITED STATES PATENT AND TRADEMARK OFFICE
CERTIFICATE OF CORRECTION

| | | |
|---|---|---|
| PATENT NO. | : 8,433,256 B2 | Page 1 of 1 |
| APPLICATION NO. | : 13/437411 | |
| DATED | : April 30, 2013 | |
| INVENTOR(S) | : Ahmadreza Rofougaran | |

It is certified that error appears in the above-identified patent and that said Letters Patent is hereby corrected as shown below:

In the Claims

Col. 13, line 43, in claim 4: after "includes at least" delete "one of"
Col. 14, line 8, in claim 7: after "wherein the" delete "wherein the"
Col. 14, line 19, in claim 10: after "includes at least" delete "one of"
Col. 14, line 62, in claim 15: after "indicates at least" delete "one of"

Signed and Sealed this
Twenty-eighth Day of January, 2014

Michelle K. Lee
*Deputy Director of the United States Patent and Trademark Office*